United States Patent [19]

Bussiere et al.

[11] Patent Number: 4,851,238

[45] Date of Patent: * Jul. 25, 1989

[54] PROCESS FOR MANUFACTURING UNCOOKED OR PART-COOKED PRESSED CHEESES

[75] Inventors: Guy Bussiere, Ramonville; Jean Lablee, Mamirolle, both of France

[73] Assignee: Roquette Freres, Lestrem, France

[ * ] Notice: The portion of the term of this patent subsequent to Jul. 25, 2006 has been disclaimed.

[21] Appl. No.: 942,976

[22] Filed: Dec. 17, 1986

[30] Foreign Application Priority Data

Dec. 17, 1985 [FR] France ................................ 85 18685

[51] Int. Cl.$^4$ ...................... A23C 19/05; A23C 19/068
[52] U.S. Cl. ......................................... 426/39; 426/40; 426/582
[58] Field of Search ........................ 426/34, 36, 37, 38, 426/39, 40, 42, 43, 61, 580, 582, 491, 657

[56] References Cited

U.S. PATENT DOCUMENTS 2,982,654  5/1961  Hammond et al. .................... 426/36
4,020,186  4/1977  Edwards ................................ 426/39

OTHER PUBLICATIONS

Hicks et al., "Equipment and Procedure for Manufacturing Laboratory Cheese Curd", J. Dairy Sci. 1981, 64: 523–525.

Primary Examiner—Marianne Cintins
Attorney, Agent, or Firm—Fleit, Jacobson, Cohn, Price, Holman & Stern

[57] ABSTRACT

In the process of the invention for manufacturing "semi-hard cheeses" of the type of uncooked or part-cooked pressed cheeses from milk, in the course of the phase of preparation of the milk before renneting, an acidogen selected from the group consisting of gluconolactones and glucoheptonolactones is added to the milk in an amount sufficient to attain simply and reliably, in a predetermined time, the exact predetermined renneting pH having a value between 6.65 and 6.30. The acidogen is advantageously gluconodeltalactone.

11 Claims, No Drawings

PROCESS FOR MANUFACTURING UNCOOKED OR PART-COOKED PRESSED CHEESES

The invention relates to a novel process for manufacturing uncooked or partly-cooked pressed body cheeses or "uncooked or part-cooked pressed cheeses".

More precisely, the invention relates to a novel process for manufacturing uncooked or part-cooked pressed cheeses, in which the acidification of the milk before renneting is carried out in a controlled manner by means of an acidogen.

The invention therefore relates to a process for manufacturing cheeses comprising a pressing step and possibly a step of part-cooking the body (of the cheese).

Within the scope of the invention, by uncooked or part-cooked pressed cheeses is meant particularly those of which the manufacturing process comprises a pressing phase, and generally phases of washing the curd and/or heating the curd-whey mixture to a temperature not exceeding 45° C. and of which the dry extract is generally comprised between 45 and 60%, such as cheeses of the PortSalut, Tome, Mamirolle, Cantal, Gouda, Edam, Tilsit, Saint-Paulin, Reblochon and Morbier types, and cheeses for melting (or processed cheeses).

Several studies have been carried out until now in order to industrialize the manufactures of this type of cheese and more particularly that of Cheddar cheese.

To do this, acidogens among which are particularly GDL were used at different stages of the manufacture of Cheddar cheese, the acidification of the curd being due to the acidogen alone or in combination with lactic ferments.

Cheddar cheese is a particular cheese, in the sense that it has two original manufacturing stages, namely cheddarization and crushing, after cooking the curd.

The cheddarization consists of subjecting the curd cooked and cut up in the form of blocks, to successive turning over for about 2 hours at a temperature close to that of the cooking.

This step enables a progressive acidification of the cheese, an increase in the dry matter and a modification in the texture.

This step is followed by thorough crushing of the curd with the addition of salt and conventional pressing and ripening steps.

The particularity of these cheeses with respect to these cheddarization and crushing operations, resides in the development of the totality of the acidity before the forming and the pressing, which differentiates them fundamentally from part-cooked or uncooked pressed cheeses in the sense that this expression is understood according to the invention.

This difference tends to explain that nothing hitherto has been attempted to extrapolate the studies done on Cheddar to the other uncooked or partly cooked pressed cheeses and thus the idea of controlling the pH on renneting had not yet found a solution.

Thus the manufacture of uncooked or part-cooked pressed cheeses concerned by the invention is constituted by the following steps: preparation of the milk, renneting, coagulation, forming and ripening.

By "forming" is meant here a treatment comprising at least one and at most all of the following operations: cutting up—cutting with grinding—grinding (or milling), possible washing, possible heating, moulding-draining pressing, taking from the mould-salting.

The different steps mentioned above will be explained hereafter.

Preparation of the milk

This phase implies the operations of possible heat treatment of the raw milk and maturation by the action of lactic ferments which lead to an acidification of the milk to a pH value corresponding to the requirements for the subsequent renneting step, generally comprised between 6.65 and 6.30.

Renneting

To the maturated milk are added the coagulating enzymes.

Coagulation

The characteristics of the coagulum are strictly dependent on the coagulation kinetics. Among the four basic parameters governing this physico-chemical reaction, which are: the coagulating enzymes, the soluble calcium, the temperature and the acidification, the acidification generated by the fermenting activity must evolve progressively during the whole duration of the phases of coagulation adn draining.

Cutting up-cutting with grinding-grinding (or milling)

This step is for the purpose of dividing the curd to obtain grains having a desired size.

Possible washing

This has the effect of de-acidifying the curd.

Possible heating

It has the effect; among other things of accentuating the removal of the whey from the grains of curd.

Moulding-draining

Pressing

This phase permits the shaping and the obtaining of the cohesion of the cheese, whilst achieving the extraction of the whey.

Taking from the mould-salting

At this stage, the cheese must have reached a pH value comprised between 4.80 and 5.40, this value being associated with the type of uncooked or part-cooked pressed cheese produced, as a function of the desired organoleptic properties for the finished product.

Ripening

This is the final step in the manufacture of these cheeses. It consists of preserving the cheese under controlled conditions of temperature and humidity, in order to optimize the organoleptic properties, particularly texture and flavour.

In any event, in the manufacture of the different types of uncooked or part-cooked pressed cheeses in the sense where this expression is intended according to the invention, the preparation phase of the milk is of primary importance; the invention is intended to improve this phase.

Numerous studies have concerned the phase relating to the preparation of the milk. Thus today it is preferred to heat-treat the raw milk in order to destroy its common flora in order to improve the bacteriological quality of the milk and to increase its preservability. This technique is now widely used in large capacity plants, whilst the use of raw milk is reserved sooner for plants of smaller size or for the manufacture of cheeses which have, for reasons of appelation of origin, necessarily to be prepared from raw milk.

It remains nonetheless undeniable that the presence of lactic ferments is indispensable in cheese-making techniques. In fact, these lactic ferments play an essential part in the phase of acidification of the milk leading to the formation of the coagulum and in the acidification phase of the curd until the end of draining, as well as in the development of the organoleptic properties of the finished product.

In the case of raw milk, the common lactic flora, naturally present in the milk ensures traditionally the acidification, but the possibility of reinforcing its action by the further addition of lactic ferment cultures cannot be excluded.

In the case of heat-treated milk, it is necessary to seed with lactic ferment cultures according to suitable techniques. Thus numerous variants exist today by reason particularly of the fact that the time separating the moment of arrival of the milk at the plant from that of its employment in cheese manufacture (renneting) is variable to a high degree since it is dependent among other things on the techniques of collection, the geographical gathering areas, the time or period of the year, the time of the week. . . .

Rather generally, the phase of preparation of the milk comprises, besides the heat treatment and the standardisation of the composition in fats and proteins, a maturation step whose acidification kinetics is a function of the temperature and of course, of the amount of lactic leavens added. This addition of lactic ferments must be moderated in order to tend towards a mastery of this fermentation and to be able to carry out the renneting at the required pH.

The renneting pH must be fully respected according to the type of uncooked or part-cooked pressed cheese manufactured. But then taking into account the phase of almost exponential growth of the lactic flora, the pH decreases too rapidly, which renders extremely delicate the determination of the moment at which the addition of the coagulating enzymes must be made.

Now, it is well known by the man skilled in the art that the pH on renneting conditions the coagulation and the subsequent operations, as well as the characteristics of the finished product.

There is hence an interest which is certain in the development of a novel process rendering possible the elimination of the above-described drawbacks, inherent in the operation of preparation of the milk for the manufacture of uncooked or part-cooked pressed cheeses.

Applicants have developed a novel process of manufacturing uncooked or part-cooked pressed cheeses enabling mastery of the step of preparation of the milk, thus facilitating the automatization of manufacturing lines, and this without the organoleptic properties of the finished products becoming changed in any disadvantageous manner.

This novel process of manufacturing uncooked or part-cooked pressed cheeses is characterized by the fact that the milk is acidified in a controlled manner, particularly from its initial pH value on reception, usually comprised between 6.6 and 6.8, to a pH value comprised between 6.65 and 6.30, by means of an acidogen.

Applicants have in fact observed that, surprisingly, the use of an acidogen enabled simply and reliably the obtaining of pHs before renneting which were relatively acid, and this in a predetermined time and without affecting unfavourably the subsequent steps of the manufacture of the uncooked or part-cooked pressed cheese and the organoleptic characters of the products obtained.

The milk raw material serving for the manufacture of uncooked or part-cooked pressed cheeses according to the present invention, may be any milk or mixture of milks of any origin, in particular those usually employed in the manufacture of uncooked or part-cooked pressed cheeses according to the prior art.

By acidogen, is meant here any substance neutral from the point of view of the pH and capable, after solubilization in an aqueous medium, of being gradually converted into an acid.

Among the substances of this type, are found certain acid anhydrides, lactides and particularly those with a low melting point of lactic acid, lactones such as gluconolactones and glucoheptonolactones, and similar sustances and/or their mixtures.

These definitions having been given, according to the invention there is provided a process for manufacturing uncooked or part-cooked pressed cheeses according to which the successive steps of preparation of the milk, renneting, coagulation, forming and ripening are carried out, characterized by the fact that in the course of the phase of preparation of the milk, the latter is acidified in a controlled manner to a pH value comprised between 6.65 and 6.30, by means of an acidogen.

It is well known that the kinetics of transformation of an acidogen into an acid is strictly dependent on the temperature of the aqueous medium in which it is solubilized. Consequently, from the three basic parameters of the milk used in the cheese-making industry which are:

the initial pH of the milk,
the pH required for renneting,
the temperature of the milk, the technician can determine accurately the acidogen dose to incorporate and the time required to reach the desired renneting pH, knowing with certainty the hydrolysis kinetics of the acidogen.

This improvement brought about by the addition of the acidogen at the time of maturation leads therefore to a complete and total mastery of the phase of preparation of the milk, thus improving the conditions of automatization of the production lines of uncooked or part-cooked pressed cheeses.

This addition of acidogen may be effected indifferently in the form of powder or in the form of solution.

In the case where the acidogen is added in powder form, its dispersion in the milk and its solubilization are ensured by any suitable stirring means.

In the case where it is preferred to introduce this acidogen in the form of a solution, the latter is advantageously prepared at the time of use, in order to limit, as much as possible, the hydrolysis of the acidogen. In fact, if by this hydrolysis, the acidogen solution has too great an acidity, the well-known drawbacks associated with the direct use of acids in industrial production of uncooked or part-cooked pressed cheeses, would again manifest themselves.

In practice, and taking into account the particularities peculiar to each manufacturing line for uncooked or part-cooked pressed cheeses, the technician, knowing the hydrolysis kinetics of the acidogen employed, will determine the best moment for its introduction.

By way of indication, the acidogen could be introduced:

into the raw milk, or
into the milk after possible heat treatment.

It is well understood that other modifications could be envisaged.

In all cases, it is convenient, to determine the moment at which the acidogen must be introduced, to take into account its hydrolysis kinetics at the temperature of the milk at the moment of the introduction and up to renneting.

In certain cases, it will be preferred to choose a dose of acidogen such that, after complete hydrolysis of this agent, the milk is at the required pH for renneting. In other cases, this dose can be higher, so that the hydrolysis of the acidogen at the pH determined for renneting is incomplete, thus facilitating subsequent acidification of the renneted milk.

Thus a suitable dose of acidogen can enable mastery of the acidification in the course of the manufacturing steps which follow renneting, particularly by ensuring a reproducible drop in pH from renneting to coagulation and then at least until cutting with grinding.

This controlled acidification on renneting and in the course of the steps which follow renneting is advantageously practiced when the ferments employed for the subsequent acidification of the curd have a long latent period, particularly in the case of the use of ferments for the direct seeding of the milk, used in frozen of lyophilized form.

In the same way, Applicants have observed that the controlled acidification on renneting and in the course of the steps which follow renneting, permits, under certain conditions, a reduction in manufacturing times.

Besides the technical advantages associated with the mastery of the pH during the maturation and through this fact the improvement in the possibilities in automatizing the production lines of uncooked or part-cooked pressed cheeses, Applicants have, as has been stated above, established the fact that the replacement of the lactic ferments by an acidogen in the maturation phase of the milk was, unexpectedly, without significant incidence on the characteristics of texture and taste of the ripened uncooked or part-cooked pressed cheeses.

The process according to the invention does not imply for all that, the elimination of lactic ferments or of any other ferment. It is, in fact, possible to introduce lactic ferments or any other microorganism in the course of the employment of the process according to the invention in an amount and at a moment which will be a function of the desired technological or qualitative objectives such as, for example, particular organoleptic characters.

Thus, lactic ferments could be introduced at the level of the maturation, but it would then be necessary for their amount to be sufficiently low not to influence significantly the kinetics of reduction of the pH, in order not to re-encounter the drawbacks of the prior art. On the other hand, the amount of lactic ferments could be greater if they are introduced at the moment of renneting.

The acidogens used preferably within the scope of the invention are the gluconolactones and the glucoheptonolactones, more preferably the gluconolactones and particularly gluconodeltalactone (GDL).

Besides the aforesaid advantages, the excellent solubility in aqueous media of GDL and its hydrolysis kinetics at the temperatures traditionally encountered in the manufacture of uncooked or part-cooked pressed cheeses, particularly in the course of the phase of preparation of the milk, render it perfectly adapted to the requirements particular to the manufacture of these cheeses.

Advantageously, the amount of acidogen employed within the scope of the invention is from 1 to 2000 g/hl of milk. Preferably, it is comprised between 2 and 500 g/hl of milk, according to the acidogen used.

Thus, in the particular case where the acidogen is GDL, the amount employed is advantageously from 1 to 500 g/hl of milk. Preferably, it is comprised between 2 and 300 g/hl of milk, and more preferably between 5 and 200 g/hl of milk.

The invention will be better understood with aid of the following examples which comprise the description of advantageous embodiments. All these examples have been carried out by I.T.I.L. in the premises of Ecole Nationale d''Industrie Laitière of Mamirolle-Besancon (France).

Manufacture of an uncooked pressed cheese called Mamirolle.

EXAMPLE 1

Control

It corresponds to a standard manufacture carried out regularly for the marketing of cheeses.

Received the day before in the morning, the milk is left for 24 hours at 6° C. in a "holding" vat.

1250 l of milk are prepared under the normal industrial conditions: standardization in composition to 29 g/l of fats per mixture of 300 l of skimmed milk and 950 l of whole milk with 38 g/l of fat. These two fractions successively undergo heat treatment on a plate exchanger at 72° C. for 40 seconds with an outflow temperature of 31° C. In industrial practice, the fraction of skimmed milk is prepared first: the whole milk is subjected to a first heating to 50° C. in the plate exchanger, then it passes into the skimmer; the skimmed milk then comes back to the exchanger where it undergoes the end of the heat cycle: 72° C. for 40 seconds then cooling to 31° C. 300 l of this heat treated skimmed milk are run into the vat specially designed for the maturation of the milk for the manufacture of pressed cheeses: an oval vat manufactured by the Guerin S.A. Company (79210 Mauzé-sur-le-Mignon, France)-type 3000 l, equipped with two curd cutters with vertical wires separated by about 1.5 cm and equipped in the down and back position with "shoes" serving for the cutting with grinding when the direction of rotation is reversed.

The heat treatment of the whole milk is then carried out and 950 l of this milk at 31° C. are mixed with 300 l of skimmed milk. In this way, 1250 l of standardized and heat-treated milk are obtained.

The pH measured on the whole milk at the time of its introduction at 31° C. into the vat is 6.70±0.02.

An addition of soluble calcium salt is then made in the proportion of 240 ml of a solution comprising 520 g/l of calcium chloride.

The maturation is then carried out by an addition of mesophilic lactic ferments under the following conditions: a concentrated and frozen preparation, marketed by Miles Laboratories-Division Marshall (rue des Longs Réages—28230 Epernon, France), is cultivated in Marstar nutrient medium, marketed by the same Laboratories, applying strictly the conditions of preparation recommended by these Laboratories. 0.6% of this culture (expressed by volume with respect to the milk) namely 7.5 l, is then mixed in the course of filling the vat with the whole milk.

The objective is that at the end of maturation, that is to say 30 minutes after the introduction of the lactic ferments, the pH of the milk is comprised between 6.55 and 6.60.

In the precise case of this test, after 30 minutes of maturation, the pH is 6.60±0.02 and the temperature is 31° C.

The renneting is carried out in the maturation vat by the addition of 0.31 ml/l of milk of a commercial preparation of coagulating enzymes containing 520 mg of chymosin per liter.

The setting time, that is to say the time between the moment when the enzyme is added and that when it is observed by manual examination that there is a start of coagulation, must be 14 minutes; it is found to be 15 minutes in the precise case of this test. The milk is again left to coagulate, under the traditional conditions, for 6 minutes, this time being called the hardening time.

The coagulum is cut up in the maturation vat by the slow rotation of the two curd cutters which must each complete 3 revolutions per minute. After this a standing time of 7 minutes is observed. The cutting-up-cutting with grinding then takes place by means of the two curd cutters: for one minute with a rotary speed of 12.5 rpm, then 3 minutes with a speed of 10 rpm. At the end of this, the grains of curd have reached the desired size, comprised between 0.5 and 1 cm. The curd-whey mixture is left to stand for 5 minutes. The pH is then 6.58 ±0.02.

The operation of washing the curd is then carried out: after prior removal of 30% (with respect to the initial volume of 1250 l) of supernatant whey by means of a pump whose suction end is equipped with a strainer, there is added an equal volume of drinking water at 35° C.

Then follows a cutting with grinding (by reversing the direction of rotation of the curd cutters) comprising a first phase of 6 minutes at fast speed (13 rpm) in order to individualize the grains which have a tendency to agglomerate, then a second phase of 2 minutes at a speed of 7 rpm. The temperature is then 31.5° C.

The curd-whey association is then transferred by gravity into the pre-pressing vat (length 1.82 m; width 1.75 m; height 0.62 m, whose two opposite vertical surfaces are perforated to permit drainage of the whey) equipped previously internally with a linen cloth with a mesh of the order of 2 mm. This cloth is then folded back onto the upper part of the curd so as to enclose it entirely. The pre-pressing operation in the vat is then carried out for 20 minutes by distributing over the whole upper surface a load such that there is an even pressure of about 600 Pa (6 g/cm$^2$).

At the end of this, a firm and cohesive curd slab is obtained which is cut up into loaves with a square base of 38.5 cm side, which are then each positioned in a mould and placed in a press in premises at 18° C.

The pressing then takes place for about 8 hours, with a pressure of about 6.10$^3$ Pa (60 g/cm$^2$) a turning over of the loaves (for regularization of the shape) being carried out 15 minutes after the start.

At the end of pressing, each loaf is cut up into 12 parallelipipeds which correspond to the final size of the cheeses (length: 19 cm, width and height: 6.5 cm). The pH is then 5.30±0.02.

These cheeses are immediately salted manually at the surface with salt in crystals, then left to cool overnight in a place at 12° C. whilst waiting the true salting operation carried out the following morning by dipping for 4 hours in a brine at 12° C., of pH 5.2 and density 1.180, that is to say with 275 g of salt/l of brine.

After emergence from the bath, the cheeses are left to drain again for about 20 hours in a place at 12° C.

Finally ripening takes place over 10 days in premises at 12° C. and almost saturated with moisture. At the rate of twice-weekly, the cheeses are rubbed manually on all surfaces with a cloth dipped in a solution constituted by:
 10 l of water,
 two standard doses of a lyophilised commercial preparation of Brevibacterium linens bacteria, marketed by the Lacto-Labo Company (B.P. 10-23, rue du Collège—86220 Dange-Saint-Romain, France), and
 a solution of ammonia in an amount such that the pH is brought to about 9.

The wrapping is preceeded with superficial drying of some hours in premises at 6°–7° C., at a relative humidity (RH) of 85% and highly ventilated. The cheeses are then preserved at 6°–7° C. until marketing.

The cheeses obtained show the typical orange/red colour, their paste or body is very soft. Their dry extract is 48.2%.

The values of the parameters read off are shown in the first column of the Recapitulatory Table I which follows.

EXAMPLE 2 according to the invention

It is identical with Example 1 except that:

at the start of maturation, the lactic ferments are eliminated and replaced by 15 g/hl of crystalline gluconodeltalactone (GDL) marketed by the Roquette Freres Company—62136 Lestrem (France), introduced in the same manner, that is to say in the course of filling involving the stirring of the whole and facilitating the solubilization of the GDL;

the lactic ferments not introduced at the start of maturation in Example 1 are introduced upon renneting.

The values of the parameters read off are shown in the second column of the Recapitulatory Table I.

The cheeses obtained are very similar as regards appearance and texture to the cheeses of Example 1 and no difference in taste is noticed during their tasting.

| Manufacture of uncooked pressed cheeses Mamirolle type Recapitulatory Table I | | |
|---|---|---|
| | Example 1 | Example 2 |
| lactic ferment prep. (%) | 0.6 | — |
| GDL (g/hl) | — | 15 |
| Initial pH of the milk (±0.02) | 6.70 | 6.72 |
| renneting pH (±0.02) | 6.60 | 6.57 |
| lactic ferment prep. on renneting (%) | — | 0.6 |
| Setting time (min.) | 15 | 14 |
| pH at the end of cutting with grinding (±0.02) | 6.58 | 6.55 |
| pH of the cheese at the end of cutting (±0.02) | 5.30 | 5.25 |
| final dry extract (%) | 48.2 | 48.4 |

Manufacture of an uncooked pressed cheese of the St Paulin type in a pilot tank of 500 l.

EXAMPLE 3

Control

Received in the afternoon, the milk is prepared under the usual industrial conditions: standardization of the composition in protein and fat materials and then pasteurization at 75° C. for 40 seconds and cooling to a temperature of about 12° C.

The standardized and cooled milk is then seeded with frozen mesophilic lactic ferments for direct seeding of DVS type (Direct Vat Starters), marketed by the Boll company (le Moulin d'Aulnay, BP 64—91292 Arpajon Cedex, France). When the desired pH is reached (6.65±0.02), the cold prematuration tank is cooled from 12° C. to 6° C. so as to stop the lactic fermentation until the time of using the milk for the manufacture properly so called.

At the time of manufacture, about 500 l of milk are heated to 30° C. and transferred to a pilot tank. When the tank is full, the ferments having already been introduced the day before, renneting is made by the addition of a commercial solution of coagulating enzyme in a suitable amount for this manufacture.

The pH objective is 6.58±0.02 at the moment of renneting. In the particular case of this test, the pH measured at the moment of renneting is 6.60±0.02, the temperature 29.8° C.

The setting time as defined in Example 1 must be 15 minutes; it is found to be 18 minutes in this test.

The coagulum is left standing for the time of hardening which is then 15 minutes. It is then cut up by means of two curd cutters for 4 minutes. Grinding then follows by replacing the curd cutters by grinding blades.

Washing of the curd then follows by drawing off about a third of the whey and replacing it with water at 30° C. After a second grinding and partial withdrawal of the whey, emptying the vat into the pre-pressing tank follows where the whey is removed through the perforated walls of this tank.

The working time in the tank is until this moment 1 h 15 min. After the pre-pressing, the partially drained curd, in the form of a curd cake, is then cut up and placed in moulds, these moulds being placed in a press for 40 minutes.

The cheeses, after pressing, continue their acidification up to the moment of brining which lastes 16 h.

The cheeses obtained possess the normal organoleptic characteristics of the St Paulin type cheeses: dry washed rind, yellow body, soft without openings.

The values of the parameters read off are given in the first column of the Recapitulatory Table II which follows.

EXAMPLE 4

According to the invention

It is identical with Example 3, except that:

Upon preparation of the milk, the lactic ferments are eliminated and replaced by 18 g/hl of crystalline gluconodeltalactone (GDL), marketed by the Roquette Freres Company—62136 Lestrem (France).

In the tank filled with milk at 12° C., kept under stirring the GDL is poured in powder form. Stirring is continued for at least 30 minutes to ensure the complete dissolving of the GDL and a good homogeneity of the mixture.

Contrary to what happens with the use of lactic ferments, hydrolysis of the GDL into gluconic acid enables an accurate pH to be obtained without risk of subsequent change; it is hence unnecessary to proceed with cooling to 6° C. as in Example 3.

The following day, the milk is heated to 30° C. for the manufacture as in Example 3, but there follow, after filling the tank, the addition of lactic ferments and renneting, the role of the lactic ferments being to permit subsequent acidification of the curd.

The values of the parameters read off are given in the second column of Recapitulatory Table II. It is observed particularly that the pH objective for renneting of 6.58±0.02 is precisely reached with gluconodeltalactone. Moreover, the setting time of 15 min., and the working time in the tank of 1 h 05 min. are improved with respect to the control of Example 3.

The cheeses obtained are very similar, as regards appearance, texture and organoleptic qualities, to the cheeses of Example 3.

| Manufacture of uncooked pressed cheeses of the St PAULIN type Recapitulatory Table II | | |
|---|---|---|
| | Example 3 | Example 4 |
| Lactic ferments in cold prematuration (g) | 37 | 0 |
| GDL (g/hl) | 0 | 18 |
| Initial pH of the milk (±0.02) | 6.68 | 6.68 |
| pH upon renneting (±0.02) | 6.60 | 6.58 |
| Lactic ferments upon renneting (g) | 0 | 6.58 |
| Time of setting (min) | 18 | 15 |
| Time of work in tank | 1 h 15 min | 1 h 05 min |

We claim:

1. A process for manufacturing, from milk, semi-hard cheeses having a dry extract comprised between about 45 and 60%, selected from the group consisting of uncooked pressed cheeses and of pressed cheeses cooked to a temperature not exceeding 45° C., wherein the milk is acidified in a reproducible and reliable manner for renneting, comprising the steps of:
   providing a given volume of milk from which the semi-hard cheese is to be prepared;
   measuring the initial pH and the temperature of said milk;
   selecting a period of time within which the pH of the milk will be brought from the initial pH to a renneting pH, said renneting pH being between 6.65 and 6.30 and said renneting pH being the required renneting pH for the type of semi-hard cheese being manufactured;
   acidifying the milk for renneting solely by adding an acidogen to the milk, said acidogen being selected from the group consisting of gluconolactones and glucoheptonolactones and said acidogen being added to the milk in an amount which is the minimum amount required to bring the initial pH of the milk to the renneting pH within the selected period of time, said minimum amount of acidogen being determined based on the kinetics of transformation of the acidogen at said temperature of the milk and as a function of the volume of the milk and the selected period of time, whereby the milk is acidified for renneting and brought from the initial pH to the renneting pH solely by the acidogen;
   renneting the prepared milk by adding coagulating enzymes to the prepared milk; and then
   coagulating,
   dividing the curd obtained by coagulating into grains having a desired size,
   moulding-draining,
   pressing,
   taking from the mould-salting, and ripening.

2. A process according to claim 1, further comprising the step of adding lactic ferments to the milk prior to renneting, said lactic ferments being adding for organoleptic and textural purposes only and being added at a time and in an amount such that the lactic ferments do not influence acidification for obtaining the renneting pH of the milk by the acidogen.

3. A process according to claim 1, further comprising the step of heating the curd to a temperature not exceeding 45° C. after dividing the curd and before moulding draining.

4. A process according to claim 1, wherein the acidogen is introduced into a raw milk.

5. A process according to claim 1, wherein the acidogen is introduced into a heat treated milk.

6. A process according to claim 1, wherein the amount of acidogen employed is from 1 to 2000 g/hl of milk.

7. A process according to claim 1, wherein the amount of acidogen employed is between 2 and 500 g/hl of milk.

8. A process according to claim 1, wherein the acidogen employed is gluconodeltalactone (GDL).

9. A process according to claim 1, wherein the amount of GDL employed is from 1 to 500 g/hl of milk.

10. A process according to claim 1, wherein the amount of GDL employed is between 2 and 300 g/hl of milk.

11. A process according to claim 1, wherein the amount of GDL employed is between 5 and 200 g/hl of milk.

* * * * *